US011177478B2

(12) United States Patent
Matsuzaki et al.

(10) Patent No.: US 11,177,478 B2
(45) Date of Patent: Nov. 16, 2021

(54) CROSSLINKED POLYMER BINDER FROM CROSSLINKABLE MONOMER FOR NONAQUEOUS ELECTROLYTE SECONDARY BATTERY AND USE THEREOF

(71) Applicant: TOAGOSEI CO., LTD., Tokyo (JP)

(72) Inventors: Hideo Matsuzaki, Nagoya (JP); Tomoko Nakano, Nagoya (JP)

(73) Assignee: TOAGOSEI CO. LTD., Tokyo (JP)

( * ) Notice: Subject to any disclaimer, the term of this patent is extended or adjusted under 35 U.S.C. 154(b) by 134 days.

(21) Appl. No.: 16/307,066

(22) PCT Filed: Aug. 29, 2017

(86) PCT No.: PCT/JP2017/030933

§ 371 (c)(1),
(2) Date: Dec. 4, 2018

(87) PCT Pub. No.: WO2018/043484

PCT Pub. Date: Mar. 8, 2018

(65) Prior Publication Data

US 2019/0148731 A1 May 16, 2019

(30) Foreign Application Priority Data

Aug. 31, 2016 (JP) ............................. JP2016-168872

(51) Int. Cl.

| | |
|---|---|
| ***H01M 4/62*** | (2006.01) |
| ***H01M 4/134*** | (2010.01) |
| ***H01M 4/133*** | (2010.01) |
| ***H01M 4/131*** | (2010.01) |
| ***H01M 4/02*** | (2006.01) |
| ***H01M 10/0525*** | (2010.01) |
| ***C08F 220/18*** | (2006.01) |
| ***C08F 220/06*** | (2006.01) |
| ***C08F 20/00*** | (2006.01) |
| ***C08F 16/32*** | (2006.01) |
| ***H01M 4/04*** | (2006.01) |
| ***C08J 3/24*** | (2006.01) |

(52) U.S. Cl.

CPC ........... *H01M 4/622* (2013.01); *C08F 220/06* (2013.01); *C08F 220/18* (2013.01); *C08J 3/24* (2013.01); *H01M 4/0404* (2013.01); *H01M 4/131* (2013.01); *H01M 4/133* (2013.01); *H01M 4/134* (2013.01); *H01M 10/0525* (2013.01); *C08F 16/32* (2013.01); *C08F 20/00* (2013.01); *C08F 2800/20* (2013.01); *C08F 2810/50* (2013.01); *H01M 2004/027* (2013.01); *H01M 2004/028* (2013.01)

(58) Field of Classification Search

CPC ............... H01M 4/622; H01M 4/0404; H01M 10/0525; H01M 4/131; H01M 4/133; H01M 4/134; H01M 2004/027; H01M 2004/028; C08F 220/06; C08F 220/18; C08F 16/32; C08F 20/00; C08F 2800/20; C08F 2810/50; C08F 220/1811; C08J 3/24; Y02E 60/10

See application file for complete search history.

(56) References Cited

U.S. PATENT DOCUMENTS

| | | | |
|---|---|---|---|
| 2011/0206995 A1 | 8/2011 | Matsumoto | |
| 2015/0287993 A1 | 10/2015 | Komaba et al. | |
| 2018/0108917 A1 | 4/2018 | Matsuzaki et al. | |
| 2018/0138508 A1 | 5/2018 | Komaba et al. | |

FOREIGN PATENT DOCUMENTS

| | | | | |
|---|---|---|---|---|
| CN | 104823308 A | | 8/2015 | |
| JP | 2011-258545 | * | 12/2011 | .............. H01M 4/62 |
| JP | WO 2014-088070 | * | 6/2014 | .......... H01M 10/052 |
| JP | 2015-018776 | * | 1/2015 | .............. H01M 4/13 |
| JP | 2015-018776 A | | 1/2015 | |
| JP | 5647944 B2 | | 1/2015 | |
| WO | 2010/050116 A1 | | 5/2010 | |
| WO | 2013/099990 A1 | | 7/2013 | |
| WO | 2014/065407 A1 | | 5/2014 | |
| WO | WO 2014/088070 | * | 6/2014 | ............ H01M 4/131 |
| WO | 2016/158939 A1 | | 10/2016 | |
| WO | 2016/158964 A1 | | 10/2016 | |

OTHER PUBLICATIONS

Machine translation of JP 2015-018776, Matsumoto et al., 2015 (Year: 2015).*

Machine translation of JP 2011-258545, Kobayashi et al., 2011 (Year: 2011).*

Machine translation of JPWO 2014-088070, Mesuda et al., 2017 (Year: 2014).*

Oct. 24, 2017 International Search Report issued in International Patent Application PCT/JP2017/030933.

Oct. 24, 2017 Written Opinion issued in International Patent Application PCT/JP2017/030933.

Aug. 6, 2021 Office Action issued in Chinese Patent Application No. 201780032760.2.

* cited by examiner

*Primary Examiner* — Kwang Han
(74) *Attorney, Agent, or Firm* — Oliff PLC

(57) ABSTRACT

A binder for a nonaqueous electrolyte secondary battery electrode and use thereof are described. The binder contains a crosslinked polymer or salt thereof, the crosslinked polymer having an ethylenically unsaturated carboxylic acid and a crosslinkable monomer in constituent monomers thereof, or salt thereof, wherein the crosslinked polymer includes the ethylenically unsaturated carboxylic acid in an amount of 20 to 99.95 mass % of the total constituent monomers, and the crosslinked polymer includes at least one compound selected from the group made of trimethylolpropane diallyl ether and trimethylolpropane triallyl ether as the crosslinkable monomer.

8 Claims, No Drawings

CROSSLINKED POLYMER BINDER FROM CROSSLINKABLE MONOMER FOR NONAQUEOUS ELECTROLYTE SECONDARY BATTERY AND USE THEREOF

CROSS REFERENCE TO RELATED APPLICATION

This application is a related application of Japanese Patent Application No. 2016-168872 which is a Japanese patent application filed on Aug. 31, 2016. and claims priority based on this Japanese application. and all contents described in this Japanese application are incorporated herein by reference.

TECHNICAL FIELD

The teachings herein relate to a binder for nonaqueous electrolyte secondary battery which is usable for a lithium-ion secondary battery or the like, a nonaqueous electrolyte secondary battery mixture layer composition, and a nonaqueous electrolyte secondary battery.

BACKGROUND ART

Lithium-ion secondary batteries are well known as examples of nonaqueous electrolyte secondary batteries. Lithium-ion secondary batteries are popular in mobile devices such as smart phones, tablets, and notebook computers due to their superior energy density, output density, charge-discharge cycle characteristics and the like in comparison with other secondary batteries such as lead batteries, and they have contributed to reducing the size and weight and increasing the performance of such devices. In terms of output, charging time and the like, however, they have not yet reached the level of performance required in secondary batteries for use in electrical vehicles and hybrid vehicles (vehicle-mounted secondary batteries). Therefore, research is being conducted to improve the charge-discharge characteristics at high current densities (high-rate characteristics) with the aim of increasing the output and reducing the charging time of nonaqueous electrolyte secondary batteries. Further, high durability is required for vehicle-mounted applications, it is demanded that the charge-discharge characteristics are compatible with cycle characteristics. Especially, the cycle characteristics tend to deteriorate in designs that use active materials having a high capacity or high voltage and/or thickens an electrode mixture layer for increasing energy density, which directly affects mileages per one charging operation, and a technique capable of maintaining superior cycle characteristics is being demanded.

A nonaqueous electrolyte secondary battery is composed of a pair of electrodes disposed with a separator in between and a nonaqueous electrolyte solution. Each electrode is formed of a collector and a mixture layer formed on a surface of the collector, and the mixture layer is formed by coating and drying an electrode mixture layer composition (slurry) containing an active material and a binder and the like on the collector.

Meanwhile, in recent years, aqueous electrode mixture layer compositions have also been in increased demand for reasons such as environmental protection and cost reduction. In the context of lithium-ion secondary batteries, aqueous binders using styrene butadiene rubber (SBR) and carboxymethyl cellulose (CMC) are used as the binders in electrode mixture layer compositions for negative electrodes that use carbon materials such as graphite as the active material. However, further improvements are needed to accommodate the advanced high-rate characteristics and cycle characteristics required for vehicle-mounted applications. Further, solvent-based binders of polyvinylidene fluoride (PVDF) and the like using organic solvents such as N-methyl-2-pyrrolidone (NMP) are preferred for positive electrodes of the lithium-ion secondary batteries, and no aqueous binder has been proposed that fulfills the requirements discussed above.

Active materials such as graphite and hard carbon (HC) and other carbon-based materials including conductive assistants such as Ketjen black (KC) and acetylene black (AB) are often used as components of lithium-ion secondary batteries. In general, these carbon-based materials have poor wettability by aqueous media, so to obtain a uniform electrode mixture layer composition with excellent dispersion stability, an aqueous binder having an excellent dispersion stabilizing effect on these carbon-based materials is desired. Further in the recent years, active materials containing silicon-based materials that can increase the battery capacity are gaining attention. However, since the active materials containing silicon-based materials exhibit large volume changes upon charging and discharging, problems are pointed out regarding their cycle characteristics (durability) resulting from detachment or exfoliation of the electrode mixture layer.

Further, processes such as winding, rewinding, cutting and rolling are performed in an electrode manufacturing process. If the electrode mixture layers fall off from the collectors in these processes, productivity (yield) significantly drops by contamination of production lines and occurrence of defective products. Thus, a binder having high binding ability and flex resistance, and with which mixture layer failures do not occur is being demanded.

As aqueous binders applicable to lithium-ion secondary battery electrodes, aqueous binders containing crosslinked polyacrylic acid are being proposed as described below.

Patent Literature 1 describes obtaining an excellent capacity retention rate without breakdown of an electrode structure by using a polymer in which polyacrylic acid is crosslinked with a specific crosslinking agent as a binder, even in a case of using an active material containing silicon. Patent Literature 2 describes an aqueous secondary battery electrode binder including a water-soluble polymer with a specific aqueous solution viscosity which has a structural unit derived from an ethylenically unsaturated carboxylic acid salt monomers and a structural unit derived from an ethylenically unsaturated carboxylic acid ester monomers.

CITATION LIST

Patent Literatures

Patent Literature 1: WO 2014/065407 A1
Patent Literature 2: JP 2015-18776 A

SUMMARY

Technical Problem

Patent Literature 1 describes using a crosslinked polyacrylic acid as a binder, but flex resistance (elasticity) of an electrode fabricated thereby is not sufficient in some cases. A binder described in Patent Literature 2 has improved elasticity, but is still not good with respect to dispersion stability and binding ability.

The teachings herein have been made in view of the above circumstance. That is, the aim is to provide an aqueous binder which exhibits high binding ability than conventional ability thereof and with superior flex resistance for further improvements in electrode characteristics such as high-rate characteristics and durability (cycle characteristics). Further, the teachings herein further aim is to provide a nonaqueous electrolyte secondary battery mixture layer composition and a nonaqueous electrolyte secondary battery electrode obtained by using the above binder.

Solution to Technical Problem

The inventors discovered as a result of earnest researches aimed at solving these problems that a binder that contains a crosslinked polymer of ethylenically unsaturated carboxylic acid monomers or salt thereof obtained by using specific crosslinked monomers exhibits superior binding ability and elasticity. The present teachings have been perfected based on these findings.

The present teachings are as follows.

(1) A binder for a nonaqueous electrolyte secondary battery electrode, the binder comprising a crosslinked polymer comprising an ethylenically unsaturated carboxylic acid and a crosslinkable monomer in constituent monomers, or salt thereof, wherein the crosslinked polymer comprises the ethylenically unsaturated carboxylic acid in an amount of 20 to 99.95 mass % of the total constituent monomers, and the crosslinkable monomer comprises at least one compound selected from the group consisting of trimethylolpropane diallyl ether and trimethylolpropane triallyl ether.

(2) The binder according to (1), wherein the crosslinked polymer comprises the at least one compound selected from the group consisting of trimethylolpropane diallyl ether and trimethylolpropane triallyl ether in an amount of 0.05 to 5 mass % of the total constituent monomers.

(3) The binder according to (1) or (2) above, wherein a particle diameter of the crosslinked polymer is 0.1 to 7.0 μm in a volume-based median diameter when the crosslinked polymer is neutralized to a neutralization degree of 80 to 100 mol %, subjected to water swelling in water, and then dispersed in a 1 mass % NaCl aqueous solution.

(4) A nonaqueous electrolyte secondary battery mixture layer composition comprising a binder according to any one of (1) to (3) above, an active material, and water.

(5) The nonaqueous electrolyte secondary battery mixture layer composition according to (4) above, further comprising a carbon material or a silicon material as a negative electrode active material.

(6) The nonaqueous electrolyte secondary battery mixture layer composition according to (4) above, further comprising a lithium-containing metal oxide as a positive electrode active material.

(7) A nonaqueous electrolyte secondary battery electrode comprising a mixture layer on a collector surface, the mixture layer being constituted of a nonaqueous electrolyte secondary battery mixture layer composition according to any one of (4) to (6) above.

Advantageous Effects

The binder for a nonaqueous electrolyte secondary battery electrode disclosed herein is capable of obtaining an electrode that exhibits superior binding ability and good flex resistance. Due to this, the electrode that is resistant to detachment of the mixture layer due to high-rate charging and discharging and has high durability (cycle characteristics) can be obtained. Further, the nonaqueous electrolyte secondary battery electrode mixture layer composition disclosed herein has superior dispersion stability of the active material and the like, so it can yield a nonaqueous electrolyte secondary battery electrode having a uniform mixture layer and good electrode characteristics.

Hereinbelow, the teachings herein will be described in detail. In this Description, "(meth)acrylic" means acrylic and/or methacrylic, and "(meth)acrylate" means acrylate and/or methacrylate. Further, a "(meth)acryloyl group" means an acryloyl group and/or a methacryloyl group.

A binder for a nonaqueous electrolyte secondary battery electrode of the present teachings contains a crosslinked polymer or salt thereof, and can be mixed with an active material and water to obtain an electrode mixture layer composition. This composition may be a slurry that can be coated on a collector, or it may be prepared as a wet powder and pressed onto a collector surface. The nonaqueous electrolyte secondary battery electrode of the present teachings is obtained by forming a mixture layer constituted of this composition on the surface of the collector such as a copper foil or an aluminum foil.

Each of the binder for a nonaqueous electrolyte secondary battery electrode, the nonaqueous electrolyte secondary battery mixture layer composition and the nonaqueous electrolyte secondary battery electrode, which are obtained by using this binder, will be described in detail.

(Binder)

The binder of the present teachings contains a crosslinked polymer or salt thereof having a carboxyl group. This crosslinked polymer contains an ethylenically unsaturated carboxylic acid monomer (hereinbelow may be referred to as "component (a)") in the constituent monomers in an amount of 20 to 99.95 mass % of the total constituent monomers. The content of the ethylenically unsaturated carboxylic acid monomer is preferably 30 to 99.9 mass %, and more preferably 50 to 99.9 mass %. The content of the ethylenically unsaturated carboxylic acid monomer is more preferably 60 to 99.9 mass %, and yet more preferably 70 to 99.9 mass %. When the crosslinked polymer has a carboxyl group, adhesion to a collector is improved, and the polymer exhibits excellent lithium ion dissolution effect and excellent ion conductivity, so a resulting electrode having low resistance and excellent high-rate characteristics can be obtained. This also confers water swellability, which can increase dispersion stability of an active material and the like in a mixture layer composition. If the amount of the ethylenically unsaturated carboxylic acid monomer is less than 20 mass % as a percentage of the total constituent monomers, there is a risk that dispersion stability, binding ability and battery durability may be inadequate.

In the teachings herein, comprising the ethylenically unsaturated carboxylic acid monomers in the constituent monomers means, for example, including a case of (co) polymerizing a (meth)acrylic ester monomer and thereafter hydrolyzing the same to form the carboxyl group, a case of polymerizing (meth)acrylamide and (meth)acrylonitrile and thereafter treating the same with strong alkali, and a case of subjecting acid anhydride in reaction with a polymer having a hydroxyl group.

Examples of the ethylenically unsaturated carboxylic acid monomer include (meth)acrylic acid; (meth)acrylamide alkyl carboxylic acids such as (meth)acrylamide hexanoic acid and (meth)acrylamide dodecanoic acid; ethylenically unsaturated monomers having carboxyl groups, such as succinic acid monohydroxy ethyl (meth)acrylate, ω-carboxy-caprolactone mono(meth)acrylate and ß-carboxyethyl (meth)acrylate, and (partial) alkali neutralization products thereof, and one of these may be used alone, or a combination of two or more may be used. Among these, a compound having an acryloyl group is preferred because its polymerization rate is faster, resulting in a polymer with a long primary chain length and a binder with good binding ability, and acrylic acid is especially desirable. A polymer with a high carboxyl group content can be obtained when acrylic acid is used as the ethylenically unsaturated carboxylic acid monomer.

Types of salts include alkali metal salts such as lithium, sodium and potassium salts; alkali earth metal salts such as calcium salts and barium salts; other metal salts such as magnesium salts and aluminum salts: ammonium salts, organic amine salts and the like. Among these, alkali metal salts and magnesium salts are preferable because they are less likely to adversely affect the battery characteristics, and alkali metal salts are more preferable. Lithium salts are especially preferable as alkali metal salts.

Aside from the component (a), the crosslinked polymer of the present teachings may contain other ethylenically unsaturated monomers that are copolymerizable with the component (a) (hereinbelow may be referred to as "component (b)"). As the component (b), for example, ethylenically unsaturated monomer compounds including an anionic group other than the carboxyl group, such as a sulfonic acid group or phosphoric acid group, or nonionic ethylenically unsaturated monomers may be exemplified, and the nonionic ethylenically unsaturated monomers are preferable in terms of the flex resistance.

In a case of using the nonionic ethylenically unsaturated monomers as the component (b), a proportion thereof is preferably in an amount of 0.5 to 79.95 mass %, more preferably 1 to 60 mass %, yet more preferably 1 to 40 mass %, and further preferably 1 to 30 mass % of the total constituent monomers of the crosslinked polymer. In a case where the crosslinked polymer includes the nonionic ethylenically unsaturated monomer in the amount of 0.5 mass % or more, a mixture layer with higher flexibility can be obtained, by which an electrode with superior flex resistance can be obtained. Further, due to an improved affinity with electrolyte, an effect of improving lithium ion conductivity can also be expected. On the other hand, so long as the nonionic ethylenically unsaturated monomer is in the amount of 79.95 mass % or less, a necessary amount of the component (a) can be ensured.

The nonionic ethylenically unsaturated monomers are preferably (meth)acrylic ester, (meth)acrylamide, and derivatives thereof since they can improve the binding ability of the binder.

As the (meth)acrylic ester, for example, alkyl ester (meth) acrylate compounds such as methyl (meth)acrylate, ethyl (meth)acrylate, butyl (meth)acrylate, isobutyl (meth)acrylate, and 2-ethylhexyl (meth)acrylate; (meth)acrylic ester compounds containing alicyclic structure, such as cyclohexyl (meth)acrylate, methyl cyclohexyl (meth)acrylate, isobornyl (meth)acrylate, dicyclopentanyl (meth)acrylate, dicyclopentenyl (meth)acrylate, and adamantyl (meth)acrylate; alkoxy alkyl ester (meth)acrylate compounds such as 2-methoxyethyl (meth)acrylate and ethoxy ethyl (meth) acrylate: aromatic alkyl ester (meth)acrylate compounds such as benzyl (meth)acrylate, phenylethyl (meth)acrylate, phenoxy ethyl (meth)acrylate, 2-hydroxy-3-phenoxypropyl (meth)acrylate, o-phenyl phenoxy ethyl (meth)acrylate, p-cumyl phenoxy ethyl (meth)acrylate, nonyl phenoxy ethyl (meth)acrylate, phenoxy polyethylene glycol (meth)acrylate, and o-phenyl phenoxy polyethylene glycol (meth) acrylate; and hydroxyalkyl ester (meth)acrylate compounds such as hydroxyethyl (meth)acrylate, hydroxypropyl (meth) acrylate, and hydroxy butyl (meth)acrylate may be exemplified, one of which may be used individually, or two or more of which may be used in combination.

As the (meth)acrylamide derivatives, for example, N-alkyl (meth)acrylamide compounds such as isopropyl (meth) acrylamide, t-butyl (meth)acrylamide, N-n-butoxy methyl (meth)acrylamide, and N-isobutoxymethyl (meth)acrylamide; and N, N-dialkyl (meth)acrylamide compounds such as dimethyl (meth)acrylamide and diethyl (meth)acrylamide may be exemplified, one of which may be used individually, or two or more of which may be used in combination.

Among the above, a compound having an ether bond, such as alkoxy alkyl (meth)acrylates such as 2-methoxyethyl (meth)acrylate and ethoxy ethyl (meth)acrylate, is preferable due to their high lithium ion conductivity and improvements they can bring in terms of the high-rate characteristics, and 2-methoxyethyl (meth)acrylate is more preferable.

Further, (meth)acrylic ester compounds containing alicyclic structure and aromatic alkyl ester (meth)acrylate compounds are preferable in terms of improving adhering ability with a carbon material, by which good binding ability can be achieved, and phenoxy ethyl (meth)acrylate and isobornyl (meth)acrylate are more preferable.

Among the nonionic ethylenically unsaturated monomers, compounds including the acryloyl group are preferable because a polymer with a long primary chain length can be obtained due to their fast polymerization rate, by which good binding ability can be achieved.

Aside from the non-crosslinked monomer as above, a crosslinkable monomer is used as the monomer component, and the teachings herein uses at least one compound selected from the group consisting of trimethylolpropane diallyl ether and trimethylolpropane triallyl ether (hereinbelow may be referred to as "component (c)") is used essentially as the crosslinkable monomer. An amount of use of the component (c) is preferably 0.05 to 5 mass %, more preferably 0.1 to 4 mass %, yet more preferably 0.2 to 3 mass %, and further preferably 0.3 to 2 mass % of the total constituent monomers of the crosslinked polymer. The electrode mixture layer composition exhibits sufficient binding ability when the amount of use of the component (c) is 0.05 mass % or more. Further, when the amount is 5 mass % or less, the crosslinked polymer to be obtained does not become excessively crosslinked and exhibits sufficient water swellability, by which the electrode mixture layer composition can exhibit good dispersion stability and binding ability.

The teachings herein may use crosslinkable monomers other than the component (c) simultaneously with the component (c). As the crosslinkable monomers, polyfunctional polymerizable monomers having two or more polymerizable unsaturated groups, and monomers having a self crosslinkable functional group such as a hydrolysable silyl group may be exemplified.

The polyfunctional polymerizable monomers are compounds having two or more polymerizable functional groups such as (meth)acryloyl group or alkenyl group in the molecule, and polyfunctional (meth)acrylate compounds, polyfunctional alkenyl compounds, and compounds having both (meth)acryloyl and alkenyl groups and the like may be exemplified. One of these compounds may be used individually, or a combination of two or more may be used.

Examples of polyfunctional (meth)acrylate compounds include di(meth)acrylates of dihydric alcohols, such as ethylene glycol di(meth)acrylate, propylene glycol di(meth)

acrylate, 1,6-hexanediol di(meth)acrylate, polyethylene glycol di(meth)acrylate and polypropylene glycol di(meth) acrylate; poly(meth)acrylate such as tetra(meth)acrylate or tri(meth)acrylates of trihydric and higher polyhydric alcohols, such as trimethylolpropane tri(meth)acrylate, trimethylolpropane ethylene oxide modified tri(meth)acrylate, glycerin tri(meth)acrylate, pentaerythritol tri(meth)acrylate and pentaerythritol tetra(meth)acrylate; and bisamides such as methylene bisacrylamide and hydroxy ethylene bisacrylamide and the like.

Examples of polyfunctional alkenyl compounds include polyfunctional allyl ether compounds such as pentaerythritol diallyl ether, pentaerythritol triallyl ether, tetraallyl oxyethane and polyallyl saccharose; polyfunctional allyl compounds such as diallyl phthalate; and polyfunctional vinyl compounds such as divinyl benzene and the like.

Examples of compounds having both (meth)acryloyl and alkenyl groups include allyl (meth)acrylate, isopropenyl (meth)acrylate, butenyl (meth)acrylate, pentenyl (meth) acrylate and 2-(2-vinyloxyethoxy)ethyl (meth)acrylate and the like.

Specific examples of the monomers having self-crosslinkable functional groups include vinyl monomers containing hydrolyzable silyl groups, N-methylol (meth)acrylamide, N-methoxy alkyl (meth)acrylate and the like. One of these compounds may be used individually or two or more thereof may be used in combination.

The vinyl monomers containing hydrolyzable silyl groups are not particularly limited so long as they are vinyl monomers having at least one hydrolyzable silyl group. Examples include vinyl silanes such as vinyl trimethoxy silane, vinyl triethoxy silane, vinyl methyl dimethoxy silane and vinyl dimethyl methoxy silane; acrylic acid esters containing silyl groups, such as trimethoxy silyl propyl acrylate, triethoxy silyl propyl acrylate and methyl dimethoxy silyl propyl acrylate; methacrylic acid esters containing silyl groups, such as trimethoxy silyl propyl methacrylate, triethoxy silyl propyl methacrylate, methyl dimethoxy silyl propyl methacrylate and dimethyl methoxy silyl propyl methacrylate; vinyl ethers containing silyl groups, such as trimethoxy silyl propyl vinyl ether; and vinyl esters containing silyl groups, such as vinyl trimethoxy silyl undecanoate and the like.

An amount of use of crosslinkable monomers other than the component (c) of the total constituent monomers of the crosslinked polymer is preferably 0.05 to 5 mass %, more preferably 0.1 to 4 mass %, yet more preferably 0.2 to 3 mass %, and further preferably 0.3 to 2 mass %.

To exhibit excellent binding ability with the binder containing the crosslinked polymer, the crosslinked polymer is preferably well dispersed in the mixture layer composition in a form of water-swollen particles of a suitable particle diameter. This is because when secondary aggregates of the crosslinkable polymer do not break up but persist as large-particle-size clumps, the dispersion stability of the slurry becomes insufficient, and the binder (crosslinked polymer) is nonuniformly present in the mixture layer, so that adequate binding ability may not be obtained and battery performance may be adversely affected. Even if the primary particles are dispersed without secondary aggregation, moreover, there is a similar risk that adequate binding ability may not be obtained if the particle size is too large.

When the crosslinked polymer or salt thereof of the present teachings having a neutralization degree of 80 to 100 mol % based on the carboxyl groups of the crosslinked polymer is subjected to water swelling in an aqueous medium and dispersed in a 1.0 mass % NaCl aqueous solution, the particle diameter thereof is preferably in a range of 0.1 to 7.0 μm in a volume-based median diameter. This particle diameter is more preferably in the range of 0.5 to 5.0 μm, still more preferably in the range of 1.0 to 4.0 μm, and yet more preferably in the range of 1.0 to 3.0 μm. If the particle diameter is in the range of 0.1 to 7.0 μm, because the crosslinked polymer or salt thereof is uniformly present at a suitable size in the mixture layer composition, the resulting mixture layer composition is highly stable and can exhibit excellent binding ability. Binding ability may be insufficient if the particle diameter exceeds 7.0 μm for the reasons discussed above. Further, manufacturing stability is a concern if the particle diameter is less than 0.1 μm.

If the crosslinked polymer is unneutralized or the neutralization degree is less than 80 mol %, it is neutralized to the neutralization degree of 80 to 100 mol % with an alkali metal hydroxide in an aqueous medium and subjected to thorough water swelling, after which the particle diameter is measured with the polymer similarly dispersed in the 1.0 mass % NaCl aqueous solution.

As above, the crosslinked polymer or salt thereof of the present teachings has good dispersibility, and can be stably dispersed in the form of water-swollen particles of the suitable diameter in the mixture layer composition (aqueous medium). However, scattered light may not be obtained with the particles in the water-swollen state, making it impossible to measure the particle diameter directly in the aqueous medium. The particle diameter can be measured by adding the particles to the aforementioned NaCl aqueous solution and shielding charge of the polymer because this suppresses water swelling.

If the crosslinked polymer or salt thereof disperses stably in the medium in the form of primary particles of the suitable particle diameter, or if it disperses in the medium in the form of particles of the suitable particle diameter because any secondary aggregated particles are easily broken up, uniformity in the mixture layer is high and excellent binding ability and flex resistance can be obtained.

In general, toughness of the crosslinked polymer increases as the length of the polymer chain (primary chain length) increases, allowing for greater binding ability and increasing a viscosity of the aqueous dispersion solution. Moreover, a crosslinked polymer (salt) obtained by applying a relatively small amount of crosslinking to a polymer with a long primary chain length exists in water in a form of a water-swollen microgel. In the electrode mixture layer composition of the present teachings, thickening effects and dispersion stabilizing effects are obtained through interaction of the microgel. The interactions of the microgel differ depending on the degree of water swelling of the microgel and strength of the microgel, and these are controlled by the degree of crosslinking of the crosslinked polymer. If the degree of crosslinking is too low, the microgel may not be strong enough, and the dispersion stabilizing effect and binding ability may be insufficient as a result. If the degree of crosslinking is too high, on the other hand, the dispersion stabilizing effect and binding ability may be insufficient because the microgel does not swell sufficiently. That is, the crosslinked polymer is preferably a slightly-crosslinked polymer obtained by subjecting a polymer with a sufficiently long primary chain length to a suitable degree of crosslinking.

In the mixture layer composition, the crosslinked polymer or salt thereof of the present teachings is preferably used in a form of a salt in which acid groups including carboxyl groups derived from the ethylenically unsaturated carboxylic acid monomer have been neutralized so that the neutralization degree is 20 to 100 mol %. The neutralization degree is more preferably 50 to 100 mol %, and still more preferably 60 to 95 mol %. The neutralization degree equal to or more than 20 mol % is preferable for obtaining good water swellability and the dispersion stabilization effect.

(Method for manufacturing crosslinked polymer or salt thereof)

A known polymerization method such as solution polymerization, precipitating polymerization, suspension polymerization or inverse-phase emulsification polymerization may be used for the crosslinked polymer of the present teachings, but the precipitating polymerization and suspension polymerization (inverse-phase suspension polymerization) are preferable for reasons of productivity. The precipitating polymerization is more preferable for obtaining good performance in terms of the binding ability and the like.

The precipitating polymerization is a method of manufacturing a polymer by performing a polymerization reaction in a solvent that dissolves the unsaturated monomer being the starting material but effectively does not dissolve the resulting polymer. As the polymerization progresses, the polymer particles grow larger by aggregation and polymer growth, and a dispersed solution of secondary polymer particles is obtained, in which primary particles of tens of nanometers to hundreds of nanometers are aggregated to the secondary polymer particles of micrometers to tens of micrometers in size.

Such secondary aggregation can also be suppressed by selecting the dispersion stabilizer, a polymerization solvent and the like. In general, the precipitating polymerization in which the secondary aggregation is suppressed is also referred to as dispersion polymerization.

In a case of the precipitating polymerization, the polymerization solvent may be selected from water and various organic solvents and the like depending on a type of the monomer used and the like. To obtain a polymer with a longer primary chain length, it is desirable to use a solvent with a small chain transfer constant.

Specific examples of the polymerization solvents include: water-soluble solvents such as methanol, t-butyl alcohol, acetone, methyl ethyl ketone, acetonitrile and tetrahydrofuran; benzene; ethyl acetate; dichloroethane; n-hexane; cyclohexane; and n-heptane and the like, and one of these or a combination of two or more may be used. Mixed solvents of any of these with water may also be used. In the present teachings, a water-soluble solvent means one having a solubility of more than 10 g/100 ml in water at 20° C.

Of these solvents, acetone, ethyl acetate, and acetonitrile are preferred, for example, because polymerization stability is good, with less production of coarse particles and less adhesion to a reaction vessel, because the precipitated polymer fine particles are less liable to secondary aggregation (or any secondary aggregates that occur are easily broken up in an aqueous medium), because the chain transfer constant is low, resulting in a polymer with a high degree of polymerization (long primary chain length), and because an operation is easier in a process neutralization described below.

To achieve a stable and rapid neutralization reaction during this process neutralization, moreover, it is desirable to add a small amount of a high polar solvent to the polymerization solvent. Desirable examples of this highly polar solvent are water and methanol. The amount of the highly polar solvent used is preferably 0.05 to 10.0 mass %, more preferably 0.1 to 5.0 mass %, and yet more preferably 0.1 to 1.0 mass % based on the total mass of the medium. If the ratio of the highly polar solvent is equal to or more than 0.05 mass %, the effect on the neutralization reaction is achieved, while if it is equal to or less than 10.0 mass %, there is no adverse effect on the polymerization reaction.

The teachings herein preferably includes a polymerization step in which a monomer composition including the ethylenically unsaturated carboxylic acid monomer (component (a)) by an amount of 20 to 99.95 mass % is precipitation polymerized. This polymerization step introduces the structural unit derived from the ethylenically unsaturated carboxylic acid monomer by the amount of 20 to 99.95 mass % to the crosslinked polymer. The amount of use of the ethylenically unsaturated carboxylic acid monomer is more preferably 30 to 99.9 mass %, and yet more preferably 50 to 99.9 mass %. The amount of use of the ethylenically unsaturated carboxylic acid monomer is further preferably 60 to 99.9 mass %, and yet further preferably 70 to 99.9 mass %. If the ethylenically unsaturated carboxylic acid monomer is less than 20 mass %, manufacturing stability may not be ensured sufficiently. Further, when the obtained crosslinked polymer is used as the binder, the dispersion stability, the binding ability, and the battery durability are at the risk of being insufficient.

The ethylenically unsaturated carboxylic acid monomer may be in an unneutralized state, or in the form of a neutralized salt. It may also be in the form of a partially neutralized salt in which a part of the used ethylenically unsaturated carboxylic acid monomer has been neutralized. Neutralization of a monomer containing acidic group such as the ethylenically unsaturated carboxylic acid monomer prior to the polymerization is sometimes called initial neutralization. Since the polymerization rate is high, the neutralization degree of the ethylenically unsaturated carboxylic acid monomer is preferably not more than 10 mol %, more preferably not more than 5 mol %, and yet more preferably the monomer is not neutralized from the standpoint of obtaining a polymer with a high molecular weight and excellent binding ability.

Other than the component (a), the teachings herein may include other ethylenically unsaturated monomers copolymerizable with the component (a) as a monomer component. As such other ethylenically unsaturated monomers, the aforementioned component (b) may be exemplified.

If nonionic ethylenically unsaturated monomer is used as the component (b), a ratio thereof of the total constituent monomers is preferably 0.5 to 79.95 mass %, more preferably 1 to 60 mass %, yet more preferably 1 to 40 mass %, and further preferably 1 to 30 mass %.

At least one compound (component (c)) selected from the group consisting of trimethylolpropane diallyl ether and trimethylolpropane triallyl ether being crosslinkable monomers is used essentially as the monomer component of the teachings herein. An amount of use of the component (c) of the total constituent monomers is preferably 0.05 to 5 mass %, more preferably 0.1 to 4 mass %, yet more preferably 0.2 to 3 mass %, and further preferably 0.3 to 2 mass %.

Other crosslinkable monomers other than the component (c) can be used simultaneously as the component (c) as the crosslinkable monomer, and for example, polyfunctional polymerizable monomer including two or more polymerizable unsaturated groups, and monomers having a self crosslinkable functional group such as a hydrolysable silyl group may be exemplified.

In the polymerization, 0.001 mol % or more organic amine compound is preferably used with respect to the ethylenically unsaturated carboxylic acid monomer. Polymerization reaction under the presence of the 0.001 mol % or more organic amine compound can improve polymerization stability, and the polymerization reaction progresses efficiently even under a high monomer concentration condition. An amount of use of the organic amine compound relative to the ethylenically unsaturated carboxylic acid monomers is preferably 0.01 mol % or more, more preferably 0.03 mol % or more, and yet more preferably 0.05 mol % or more. The amount of use of the organic amine compound may be 0.3 mol % or more, and may be 0.5 mol % or more.

Further, an upper limit of the amount of use of the organic amine compound is preferably 4.0 mol % or less. The polymerization stability can be improved by performing the polymerization reaction under the presence of the organic amine compound of 4.0 mol % or less, and the polymerization reaction progresses efficiently even under the high monomer concentration condition. The amount of use of the organic amine compound relative to the ethylenically unsaturated carboxylic acid monomers is preferably 3.0 mol % or less, more preferably 2.0 mol % or less, and yet more preferably 1.0 mol % or less.

In the description herein, the amount of use of the organic amine compound is expressed in molarity of the organic amine compound used relative to the ethylenically unsaturated carboxylic acid monomer, and does not mean the neutralization degree thereof. That is, the valence of the organic amine compound to be used is disregarded.

The organic amine compound may be, other than ammonia, N-alkyl-substituted amine such as monomethylamine, dimethylamine, trimethylamine, monoethylamine, diethylamine, triethylamine, monobutylamine, dibutylamine, tributylamine, monohexylamine, dihexylamine, trihexylamine, trioctylamine, and tridodesylamine; (alkyl)alkanolamine such as monoethanolamine, diethanolamine, triethanolamine, propanolamine, dimethylethanolamine, and N,N-dimethylethanolamine; cyclic amine such as pyridine, piperidine, piperadine, 1,8-bis(dimethylamino)naphthalene, morpholine, and diazabicycloundecebe (DBU); diethylene triamine; and N,N-dimethylbenzyl amine may be exemplified, one of which or two or more of which may be used.

Of these, the organic amine compound excluding ammonia is preferable from the standpoint of the binding ability. Further, use of hydrophobic amine having long chain alkyl group is preferable since larger electrostatic repulsion and steric repulsion can be obtained, by which the polymerization stability can easily be ensured even in the case with high monomer concentration. Specifically, the polymerization stabilizing effect by the steric repulsion effect is higher with a higher value (C/N) expressed by a ratio of carbon atoms relative to nitrogen atoms existing in the organic amine compound. The value of the C/N above is preferably 3 or more, more preferably 5 or more, yet more preferably 10 or more, and further preferably 20 or more.

Amine compound with high C/N value generally is a compound that is highly hydrophobic with low amine value. As above, the amine compound with high C/N value tends to exhibit high polymerization stabilizing effect, by which the monomer concentration during the polymerization can be increased, achieving the tendency to polymerize polymers (increase in primary chain length) and improve the binding ability. Further, if the polymerization is performed under the presence of the amine compound with high C/N value, there is a trend of obtaining crosslinked polymer or salt thereof with small particle diameter. Due to this, adhering performance with the active material increases, and the binding ability is improved.

A known polymerization initiator such as an azo compound, organic peroxide or inorganic peroxide may be used as the polymerization initiator, but no limitation is made to these examples. The conditions of use may be adjusted to achieve the suitable amount of radical generation, using a known method such as thermal initiation, redox initiation using a reducing agent, UV initiation or the like. To obtain the crosslinked polymer with a long primary chain length, the conditions are preferably set so as to reduce the amount of radical generation within an allowable range of manufacturing time.

Examples of the azo compound include 2,2'-azobis(2,4-dimethylvaleronitrile), 2,2'-azobis(N-butyl-2-methylpropionamide), 2-(tert-butylazo)-2-cyanopropane, 2,2'-azobis(2,4,4-trimethylpentane) and 2,2'-azobis(2-methylpropane), and one of these or a combination of two or more may be used.

Examples of the organic peroxide include 2,2-bis(4,4-di-t-butylperoxycyclohexyl) propane (product name "Pertetra A" by NOF Corporation), 1,1-di(t-hexylperoxy) cyclohexane (product name "Perhexa HC" by NOF Corporation), 1,1-di(t-butylperoxy) cyclohexane (product name "Perhexa C" by NOF Corporation), n-butyl-4,4-di(t-butylperoxy) valerate (product name "Perhexa V" by NOF Corporation), 2,2-di(t-butylperoxy) butane (product name "Perhexa 22" by NOF Corporation), t-butylhydroperoxide (product name "Perbutyl H" by NOF Corporation), cumene hydroperoxide (product name "Percumyl H" by NOF Corporation), 1,1,3,3-tetramethylbutyl hydroperoxide (product name "Perocta H" by NOF Corporation), t-butylcumyl peroxide (product name "Perbutyl C" by NOF Corporation), di-t-butyl peroxide (product name "Perbutyl D" by NOF Corporation), di-t-hexyl peroxide (product name "Perhexyl D" by NOF Corporation), di(3,5,5-trimethylhexanoyl) peroxide (product name "Peroyl 355" by NOF Corporation), dilauroyl peroxide (product name "Peroyl L" by NOF Corporation), bis(4-t-butylcyclohexyl) peroxydicarbonate (product name "Peroyl TCP" by NOF Corporation), di-2-ethylhexyl peroxydicarbonate (product name "Peroyl OPP" by NOF Corporation), di-sec-butyl peroxydicarbonate (product name "Peroyl SBP" by NOF Corporation), cumyl peroxyneodecanoate (product name "Percumyl ND" by NOF Corporation), 1,1,3,3-tetramethylbutyl peroxyneodecanoate (product name "Perocta ND" by NOF Corporation), t-hexyl peroxyneodecanoate (product name "Perhexyl ND" by NOF Corporation), t-butyl peroxyneodecanoate (product name "Perbutyl ND" by NOF Corporation), t-butyl peroxyneoheptanoate (product name "Perbutyl NHP" by NOF Corporation), t-hexyl peroxypivalate (product name "Perhexyl PV" by NOF Corporation), t-butyl peroxypivalate (product name "Perbutyl PV" by NOF Corporation), 2,5-dimethyl-2,5-di(2-ethylhexanoyl) hexane (product name "Perhexa 250" by NOF Corporation), 1,1,3,3-tetramethylbutylperoxy-2-ethylhexanoate (product name "Perocta O" by NOF Corporation), t-hexylperoxy-2-ethylhexanoate (product name "Perhexyl O" by NOF Corporation), t-butylperoxy-2-ethylhexanoate (product name "Perbutyl O" by NOF Corporation), t-butyl peroxylaurate (product name "Perbutyl L" by NOF Corporation), t-butyl peroxy-3,5,5-trimethylhexanoate (product name "Perbutyl 355" by NOF Corporation), t-hexylperoxyisopropyl monocarbonate (product name "Perhexyl I" by NOF Corporation), t-butylperoxyisopropyl monocarbonate (product name "Perbutyl I" by NOF Corporation), t-butyl-peroxy-2-ethyl hexyl monocarbonate (product name "Perbutyl E" by NOF Corporation), t-butyl peroxyacetate (product name "Perbutyl A" by NOF Corporation), t-hexyl peroxybenzoate (product name "Perhexyl Z" by NOF Corporation) and t-butyl peroxybenzoate (product name "Perbutyl Z" by NOF Corporation) and the like. One of these or a combination of two or more may be used.

Examples of the inorganic peroxide include potassium persulfate, sodium persulfate and ammonium persulfate.

When using a redox initiator, sodium sulfite, sodium thiosulfate, sodium formaldehyde sulfoxylate, ascorbic acid, sulfite gas (SO2), ferrous sulfate or the like can be used as the reducing agent.

The polymerization initiator is preferably used in the amount of 0.001 to 2 mass parts, more preferably 0.005 to 1 mass parts, and yet more preferably 0.01 to 0.1 mass parts given 100 mass parts as the total amount of the monomer components used. If the amount of the polymerization initiator is equal to or more than 0.001 mass parts, a stable polymerization reaction can be achieved, and if it is equal to or less than 2 mass parts the polymer with a long primary chain length can be easily obtained.

Regarding the concentration of the monomer components during the polymerization, a higher concentration is preferable for obtaining the polymer with a long primary chain length. If the concentration of the monomer component is too high, however, the aggregation of the polymer particles tends to progress, the polymerization heat is difficult to control, and a runaway polymerization reaction is possible. Consequently, the monomer concentration at the start of the polymerization is generally in the range of about 2 to 30 mass %, and preferably in the range of 5 to 30 mass %.

The polymerization temperature depends on the conditions such as the type and concentration of the monomer used, but is preferably 0° C. to 100° C. and more preferably 20° C. to 80° C. The polymerization temperature may be constant, or may change during the course of the polymerization reaction. Further, the polymerization time is preferably 1 minute to 20 hours, and more preferably 1 hour to 10 hours.

The target crosslinked polymer may be obtained in a powder state by applying reduced pressure and/or heat treatment or the like in a drying step to remove the solvent from the crosslinked polymer dispersed solution obtained through the polymerization step. Following the polymerization step but before the drying step, a solid-liquid separation step such as centrifugation or filtration or a washing step using water, methanol and the like may be included with the aim of removing unreacted monomers (and their salts).

When the washing step is included, even if the crosslinked polymer has undergone secondary aggregation the aggregates are easily broken up, and good performance is obtained in terms of the binding ability and battery characteristics because remaining unreacted monomers are further removed.

When the unneutralized monomer or partially neutralized salt is used as the ethylenically unsaturated carboxylic acid monomer in the present teachings, an alkali compound can be added to the polymer dispersion obtained from the polymerization step to neutralize the polymer (hereunder referred to as "process neutralization"), after which the solvent can be removed in the drying step. Alternatively, a powder of the crosslinked polymer can first be obtained in an unneutralized or partially neutralized salt state, after which the alkali compound can be added when preparing the electrode mixture layer slurry to neutralize the polymer (hereunder referred to as "post-neutralization"). Of these, process neutralization is preferable because it tends to make the secondary aggregates easier to break up.

(Nonaqueous Electrolyte Secondary Battery Electrode Mixture Layer Composition)

The nonaqueous electrolyte secondary battery electrode mixture layer composition of the present teachings contains the binder containing the crosslinked polymer or salt thereof, together with the active material and water.

The amount of the crosslinked polymer or salt thereof used in the electrode mixture layer composition of the present teachings is 0.1 to 20 mass %, preferably 0.2 to 10 mass %, more preferably 0.3 to 8 mass %, and yet more preferably 0.5 to 5 mass % of the total amount of the active material. If the amount of the crosslinked polymer or salt thereof is less than 0.1 mass %, sufficient binding ability may not be obtained. Moreover, dispersion stability of the active material and the like may be inadequate, detracting from the uniformity of the formed mixture layer. If the amount of the crosslinked polymer or salt thereof exceeds 20 mass %, on the other hand, the electrode mixture layer composition may become highly viscous, and the coating performance on the collector may decrease. Consequently, spots and irregularities may occur in the resulting mixture layer, adversely affecting the electrode characteristics. Interface resistance may also increase, detracting from the high-rate characteristics.

If the amount of the crosslinked polymer and salt thereof is within the aforementioned range, a composition with excellent dispersion stability can be obtained, and it is also possible to obtain a mixture layer with extremely high adhesiveness to the collector, resulting in improved battery durability. Moreover, because the crosslinked polymer and salt thereof has sufficient ability to bind the active material even in a small quantity (such as 5 mass % or less), and because it has carboxy anions, it can yield an electrode with small interface resistance and excellent high-rate characteristics.

Of the active materials described above, lithium salts of transition metal oxides are principally used as positive electrode active materials, and for example laminar rock salt-type and spinel-type lithium-containing metal oxides may be used. Specific compounds that are laminar rock salt-type positive electrode active materials include lithium cobaltate, lithium nickelate, and NCM $\{Li(Ni_x,Co_y,Mn_z), x+y+z=1\}$ and NCA $\{Li(Ni_{1-a-b}Co_aAl_b)\}$ and the like, which are referred to as ternary materials. Further, examples of spinel-type positive electrode active materials include lithium manganate and the like. Apart from the oxides, phosphate salts, silicate salts and sulfur and the like may also be used. Examples of phosphate salts include olivine-type lithium iron phosphate and the like. One of these may be used alone as a positive electrode active material, or two or more may be combined and used as a mixture or composite.

When the positive electrode active material containing the laminar rock salt-type lithium-containing metal oxide is dispersed in water, the dispersed solution exhibits alkalinity because the lithium ions on the surface of the active material are exchanged for hydrogen ions in the water. There is thus the risk of corrosion of aluminum foil (Al) or the like, which is a common positive electrode collector material. In such cases, it is desirable to neutralize the alkali component eluted from the active material by using an unneutralized or partially neutralized crosslinked polymer as the binder. Further, the amount of the unneutralized or partially neutralized crosslinked polymer used is preferably to be used such that the amount of unneutralized carboxyl groups in the crosslinked polymer is equal to or more than the amount of alkali eluted from the active material.

Because all the positive electrode active materials have low electrical conductivity, a conductive assistant is normally added and used. Examples of the conductive assistant include carbon materials such as carbon black, carbon nanotubes, carbon fiber, graphite fine powder, and carbon fiber. Of these, carbon black, carbon nanotubes and carbon fiber are preferable since it is easier to obtain excellent conductivity. Further, as the carbon black, Ketjen black and acetylene black are preferable. One of these conductive assistants may be used alone, or a combination of two or more may be used. The amount of the conductive assistants used is preferably 2 to 20 mass %, and more preferably 2 to 10 mass % of the total amount of the active material in order to achieve both conductivity and energy density.

Further, a positive active material having a surface coating by a conductive carbon material may be used.

On the other hand, examples of negative electrode active materials include carbon materials, lithium metal, lithium alloys, metal oxides and the like, and one of these or a combination of two or more may be used. Of these, an active material formed of a carbon material such as natural graphite, artificial graphite, hard carbon, and soft carbon (hereunder referred to as a "carbon-based active material") is preferred, and hard carbon or a graphite such as natural graphite or artificial graphite is more preferred. In the case of graphite, spheroidized graphite is desirable from the standpoint of battery performance, and the particle size thereof is preferably in the range of 1 to 20 μm, or more preferably 5 to 15 μm.

To increase the energy density, metals, metal oxides or the like capable of occluding lithium, such as silicon and tin, may also be used as the negative electrode active materials. Of these, silicon has a higher capacity than graphite, and an active material formed of a silicon material such as silicon, a silicon alloy or a silicon oxide such as silicon monoxide (SiO) (hereunder referred to as a "silicon-based active material") may be used. However, these silicon-based active materials have high capacities, whereas their volume change accompanying charging and discharging is large. Therefore, they are preferably used in combination with the aforementioned carbon-based active materials. In this case, a large compounded amount of the silicon active material can cause breakdown of the electrode material, greatly detracting the cycle characteristics (durability). From this perspective, when the silicon-based active material is included, the amount thereof is preferably equal to or less than 60 mass %, and more preferably equal to or less than 30 mass % of the amount of the carbon-based active material.

Because the carbon-based active material inherently has good electrical conductivity, it may not be necessary to add a conductive assistant. When the conductive assistant is added to further reduce resistance or the like, the amount thereof is preferably not more than 10 mass %, and more preferably equal to or less than 5 mass % of the total amount of the active material from the standpoint of energy density.

When the nonaqueous electrolyte secondary battery electrode mixture layer composition is in a slurry form, the amount of the active material used is in the range of preferably 10 to 75 mass %, and more preferably 30 to 65 mass % of the total amount of the composition. The amount of the active material equal to or more than 10 mass % is advantageous for suppressing migration of the binder and the like, and also because of drying costs of the medium. If the amount is not more than 75 mass %, on the other hand, it is possible to ensure the flowability and coating performance of the composition, and to form a uniform mixture layer.

Further, in a case where the electrode mixture layer composition is prepared in a wet powder state, the amount of the active material used is in the range of preferably 60 to 97 mass %, and more preferably 70 to 90 mass % of the total amount of the composition.

Further, from the standpoint of energy density, nonvolatile components other than the active material, such as the binder and conductive assistant, are preferably used in the smallest amounts possible within which necessary binding ability and conductivity are ensured.

The nonaqueous electrolyte secondary battery electrode mixture layer composition of the present teachings uses water as the medium. To adjust the properties such as drying properties of the composition, it is also possible to use a mixed solvent of water with a water-soluble organic solvent, which may be a lower alcohol such as methanol or ethanol, a carbonate such as ethylene carbonate, a ketone such as acetone, tetrahydrofuran, N-methyl pyrrolidone or the like. A percentage of water in the mixed solvent is preferably equal to or more than 50 mass %, and more preferably equal to or more than 70 mass %.

When the electrode mixture layer composition is in a coatable slurry form, the content of the medium including water as the percentage of the total composition is in the range of preferably 25 to 90 mass %, and more preferably 35 to 70 mass % from standpoints of slurry coating properties, energy costs required for drying, and productivity. If the electrode mixture layer composition is in the wet powder form that can be pressed, the content of the medium is preferably 3 to 40 mass % and more preferably 10 to 30 mass % from a standpoint of obtaining evenness in the mixture layer after pressing.

The binder of the present teachings may be formed solely of the crosslinked polymer or salt thereof, but this may also be combined with another binder component such as styrene/butadiene latex (SBR), acrylic latex, and polyvinylidene fluoride latex. When another binder component is included, the amount thereof is preferably 0.1 to 5 mass %, more preferably 0.1 to 2 mass %, and yet more preferably 0.1 to 1 mass % of the active material. If the amount of the other binder component exceeds 5 mass %, resistance increases, and the high-rate characteristics may become insufficient.

Of the above, styrene/butadiene latex is preferable from the standpoints of balance between the binding ability and the flex resistance.

This styrene/butadiene latex is an aqueous dispersion of a copolymer having a structural unit derived from an aromatic vinyl monomer such as styrene and a structural unit derived from an aliphatic conjugated diene monomer such as 1,3-butadiene.

Examples of the aromatic vinyl monomer include a-methyl styrene, vinyl toluene and divinylbenzene as well as styrene, and one of these or two or more may be used.

The structural unit derived from the aromatic vinyl monomer in the copolymer described above constitutes preferably 20 to 60 mass % and more preferably 30 to 50 mass % of the copolymer primarily from the standpoint of the binding ability.

Examples of the aliphatic conjugated diene monomer include 2-methyl-1,3-butadiene, 2,3-dimethyl-1,3-butadiene, 2-chloro-1, and 3-butadiene as well as 1,3-butadiene, and one of these or two or more may be used.

The structural unit derived from the aliphatic conjugated diene monomer constitutes preferably 30 to 70 mass %, and more preferably 40 to 60 mass % of the copolymer from the standpoint of the binding ability of the binder and the flexibility of the resulting electrode.

To further improve binding performance and the like, the styrene/butadiene latex may also use a nitrile group-containing monomer such as (meth)acrylonitrile or a carboxyl group-containing monomer such as (meth)acrylic acid, itaconic acid or maleic acid as a copolymerized monomer in addition to the monomers described above.

The structural unit derived from the other monomer is contained in the copolymer in the amount of preferably 0 to 30 mass %, and more preferably 0 to 20 mass %.

The nonaqueous electrolyte secondary battery electrode mixture layer composition of the present teachings has the active material, water and the binder as essential components, and is obtained by mixing each component by known methods. The methods of mixing the respective components are not particularly limited, and known methods may be used, but in a preferred method the powder components including the active material, conductive assistant and binder (crosslinked polymer particle) are dry blended, and then mixed with a dispersion medium such as water and dispersed and kneaded.

When the electrode mixture layer composition is obtained in the slurry form, it is preferably refined into a slurry without dispersion defects or aggregation. The mixing method may be one using a known mixer such as a planetary mixer, thin film swirling mixer or self-revolving mixer, and a thin film swirling mixer is preferable for obtaining a good dispersed state in a short time. When the thin film swirling mixer is used, pre-dispersion is preferably performed in advance with a disperser or other stirring device.

Further, the viscosity of the slurry is in the range preferably 500 to 100,000 mPa·s, and more preferably 1,000 to 50,000 mPa·s as the B-type viscosity at 60 rpm.

On the other hand, when the electrode mixture layer composition is obtained as the wet powder, it is preferably kneaded with a Henschel mixer, blender, planetary mixer or twin-screw kneader or the like to obtain a uniform state without concentration irregularities.

(Non-Aqueous Electrolyte Secondary Battery Electrode)

The non-aqueous electrolyte secondary battery electrode of the present teachings is provided with the mixture layer formed from the electrode mixture layer composition on the surface of the copper or aluminum collector. The mixture layer is formed by first coating the electrode mixture layer composition of the present teachings on the surface of the collector, and then drying to remove water or other medium. The method of coating the mixture layer composition is not particularly limited, and a known method such as a doctor blade method, dipping, roll coating, comma coating, curtain coating, gravure coating or extrusion may be adopted. Further, the drying may also be accomplished by a known method such as warm air blowing, pressure reduction, (far) infrared exposure or microwave exposure.

The mixture layer obtained after drying is normally subjected to compression treatment with a metal press, roll press or the like. By compressing, the active material and the binder are brought into close contact with each other, and the strength of the mixture layer and the adhesion to the collector can be improved. Preferably compression adjusts a thickness of the mixture layer to about 30% to 80% of its pre-compression thickness, and the thickness of the mixture layer after compression is about 4 to 200 μm in general.

A nonaqueous electrolyte secondary battery can be prepared by providing a separator and a nonaqueous electrolyte solution with the nonaqueous electrolyte secondary battery electrode of the present teachings.

The separator is disposed between the positive and negative electrodes of the battery, and serves to prevent short-circuits due to contact between the electrodes, hold the electrolyte solution and ensure ion conductivity. The separator is preferably an insulating finely porous film, having good ion permeability and mechanical strength. Specific materials that can be used include polyolefins such as polyethylene and polypropylene, and polytetrafluoroethylene and the like.

For the nonaqueous electrolyte solution, a known electrolyte solution commonly used in nonaqueous electrolyte secondary batteries can be used. Specific examples of the solvent include cyclic carbonates with high dielectric constants and good ability to dissolve electrolytes, such as propylene carbonate and ethylene carbonate, and linear carbonates with low viscosity, such as ethyl methyl carbonate, dimethyl carbonate and diethyl carbonate, and these may be used alone or as a mixed solvent. A lithium salt such as $LiPF_6$, $LiSbF_6$, $LiBF_4$, $LiClO_4$ or $LiAlO_4$ is dissolved in these solvents and used as the nonaqueous electrolyte solution.

The nonaqueous electrolyte secondary battery can be obtained by winding or laminating the positive plate and negative plate with the separator between the two, and enclosing this in a casing or the like.

EXAMPLES

The present teachings will be described in detail below based on examples. However, the present teachings are not limited to these examples. In the following, "parts" and "%" mean parts by mass and % by mass respectively, unless otherwise specified.

Manufacturing Example 1

Manufacture of Crosslinked Polymer R-1

A reactor equipped with a stirring blade, a thermometer, a reflux condenser and a nitrogen inlet pipe was used for polymerization.

880 parts of acetonitrile, 99.90 parts of acrylic acid (hereunder referred to as "AA"), and 0.10 parts of trimethylolpropane diallyl ether (product name "Neoallyl T-20" by Daiso Co., Ltd.) were charged into the reactor.

The inside of the reactor was thoroughly purged with nitrogen, and heated to raise its internal temperature to 55° C. Once the internal temperature was confirmed to have stabilized at 55° C., 0.0625 parts of 2,2'-azobis(2,4-dimethylvaleronitrile) (product name "V-65" by Wako Pure Chemical Industries, Ltd.) were added as the polymerization initiator, and since white turbidity was observed in the reaction solution at this point, this was taken as the polymerization initiation point. The polymerization reaction was continued with the external temperature (water bath temperature) being adjusted to maintain the internal temperature of 55° C., then cooling of the reaction solution was initiated when 6 hours had elapsed since the polymerization initiation point, and after when the internal temperature was cooled to 30° C. or lower, a slurry-like polymerization reaction solution having particles of the crosslinked polymer R-1 (unneutralized) dispersed in the medium was obtained.

The resulting polymer reaction solution was centrifuged to precipitate the polymer particles, and the supernatant was removed. The precipitate was then re-dispersed in acetonitrile having the same mass as the polymer reaction solution, and the operations of precipitating the polymer particles by centrifugation and removing the supernatant were repeated twice. The precipitate was collected and dried for 3 hours at 80° C. under reduced pressure to remove the volatile components and obtain a powder of the crosslinked polymer R-1.

Because the crosslinked polymer R-1 is hygroscopic, it was sealed and stored in a container having water vapor barrier properties.

(Measuring Average Particle Diameter of the Crosslinked Polymer R-1 Neutralized Salt in 1 Mass % NaCl Aqueous Solution)

0.25 g of the crosslinked polymer R-1 powder obtained above and 49.75 g of lithium hydroxide aqueous solution (including lithium hydroxide corresponding to 85 mol % of carboxyl group which the crosslinked polymer R-1 contains) were measured into a 100 cc container, and set in a rotating/revolving mixer ("Awatori Rentaro AR-250" by Thinky Corporation). This was then stirred (rotating speed 2,000 rpm/revolving speed 800 rpm, 7 minutes), and then defoamed (rotating speed 2,200 rpm/revolving speed 60 rpm, 1 minute) to prepare a hydrogel of the crosslinked polymer R-1 (neutralization degree 85 mol %) swelled with water.

Next, the particle size distribution of this hydrogel was measured with a laser diffraction/scattering type particle size distribution analyzer (Nikkiso Co., Ltd., Microtrac MT-3300EX2) using a 1 mass % NaCl aqueous solution as a dispersion medium. With the dispersion medium circulating in an excess amount relative to the hydrogel, when the hydrogel in an amount sufficient to obtain a suitable scattered light intensity was added and the dispersion medium was added, the measured particle size distribution shape stabilized after a few minutes. Once stability was confirmed, volume-based particle size distribution measurement was performed, and the average particle diameter was found to be 2.0 μm (median diameter (D50)).

A 85 mol % neutralized product of the crosslinked polymer R-1 swells thoroughly in ion-exchange water to form a hydrogel, but in the 1 mass % NaCl aqueous solution the degree of swelling is reduced because the electrostatic repulsion between carboxy anions is blocked, and particle size distribution measurement is possible because dispersion stability in the dispersion medium is maintained by the effect of the carboxylate salt. The smaller the median diameter as measured in the 1 mass % NaCl aqueous solution medium, the more the crosslinked polymer salt is regarded as forming the hydrogel as an aggregation of smaller (more numerous) gel particles even in the ion-exchange water. That is, this means it is broken up into smaller particles in water.

Manufacturing Example 2

Manufacture of Crosslinked Polymer R-2

The same operations were performed as in Manufacturing Example 1 except that the charged amounts of each starting material were as shown in Table 1, to obtain crosslinked polymer R-2 in powder form. The crosslinked polymer R-2 was sealed and stored in a container having water vapor barrier properties.

Further, Li neutralization product was prepared for each polymer as obtained by same operations as in Manufacturing Example 1. Three types of lithium hydroxide aqueous solution for use in the neutralization, respectively containing lithium hydroxide corresponding to 85 mol %, 90 mol %, and 95 mol % of carboxyl group which the crosslinked polymer R-2 contains, were prepared, and Li neutralization salts of the crosslinked polymer R-2 having different neutralization degrees were prepared. The average particle diameter of each neutralization salt in 1 mass % NaCl aqueous solution was measured, and the results thereof are shown in Table 1.

Manufacturing Examples 3 to 8, 12, and 14

Manufacture of Crosslinked Polymers R-3 to 8, R-12, and R-14

The same operations were performed as in Manufacturing Example 1 except that the charged amounts of each starting material were as shown in Table 1, to obtain crosslinked polymers R-3 to 8, R-12, and R-14 in powder form. The respective crosslinked polymers were sealed and stored in a container having water vapor barrier properties.

Further, Li neutralization products were prepared similar to Manufacturing Example 1 for the respective polymers as obtained, and the average particle diameters thereof were measured in the 1 mass % NaCl aqueous solution. The results are shown in Table 1.

Manufacturing Example 9

Manufacture of Crosslinked Polymer Salt R-9

A reactor equipped with a stirring blade, a thermometer, a reflux condenser and a nitrogen inlet pipe was used for polymerization.

875.6 parts of acetonitrile, 4.40 parts of ion exchanged water, 99.00 parts of AA, 1.00 parts of Neoallyl T-20 were charged into the reactor. The inside of the reactor was thoroughly purged with nitrogen, and heated to raise its internal temperature to 55° C. Once the internal temperature was confirmed to have stabilized at 55° C., 0.0625 parts of V-65 were added as the polymerization initiator, and since white turbidity was observed in the reaction solution at this point, this was taken as the polymerization initiation point. The polymerization reaction was continued with the external temperature (water bath temperature) being adjusted to maintain the internal temperature of 55° C., then cooling of the reaction solution was initiated when 6 hours had elapsed since the polymerization initiation point, and after when the internal temperature was cooled to 25° C., 49.1 parts of powder lithium hydroxide monohydrate (hereunder termed "$LiOH.H_2O$") were added. Stirring under the room temperature was continued for 12 hours after this addition to obtain a slurry-like polymerization reaction solution having particles of the crosslinked polymer salt R-9 (Li salt, neutralization degree of 85 mol %) dispersed in the medium.

The resulting polymer reaction solution was centrifuged to precipitate the polymer particles, and the supernatant was removed. The precipitate was then re-dispersed in acetonitrile having the same mass as the polymer reaction solution, and the operations of precipitating the polymer particles by centrifugation and removing the supernatant were repeated twice. The precipitate was collected and dried for 3 hours at 80° C. under reduced pressure to remove the volatile components and obtain a powder of the crosslinked polymer salt R-9. Because the crosslinked polymer salt R-9 is hygroscopic, it was sealed and stored in a container having water vapor barrier properties. The powder of the crosslinked polymer salt salt R-9 was measured by IR to obtain the neutralization degree from an intensity ratio of a peak derived from C=O group of carboxylic acid and a peak derived from C=O group of carboxylic acid Li, and the neutralization degree thereof was 85 mol %, identical to the calculated value from the charged substances.

(Measuring Average Particle Diameter of the Crosslinked Polymer Salt R-9 in 1 Mass % NaCl Aqueous Solution)

0.25 g of the crosslinked polymer salt R-9 powder obtained above and 49.75 g of ion exchanged water were measured into a 100 cc container, and set in a rotating/revolving mixer ("Awatori Rentaro AR-250" by Thinky Corporation). This was then stirred (rotating speed 2,000 rpm/revolving speed 800 rpm, 7 minutes), and then defoamed (rotating speed 2,200 rpm/revolving speed 60 rpm, 1 minute) to prepare a hydrogel of the crosslinked polymer salt R-9 swelled with water.

Next, the particle size distribution of this hydrogel was measured with the laser diffraction/scattering type particle size distribution analyzer (Nikkiso Co., Ltd., Microtrac MT-3300EX2) using a 1 mass % NaCl aqueous solution as a dispersion medium. With the dispersion medium circulating in an excess amount relative to the hydrogel, when the hydrogel in an amount sufficient to obtain a suitable scattered light intensity was added and the dispersion medium was added, the measured particle size distribution shape stabilized after a few minutes. Once stability was confirmed, volume-based particle size distribution measurement was performed, and the average particle diameter was found to be 2.2 μm (median diameter (D50)).

Manufacturing Example 10

Manufacture of Crosslinked Polymer Salt R-10

A reactor equipped with a stirring blade, a thermometer, a reflux condenser and a nitrogen inlet pipe was used for polymerization.

300 parts of methanol, 99.00 parts of AA, and 1.00 parts of Neoallyl T-20 were charged into the reactor. Then, 29.5 parts of LiOH—$H_2O$ powder and 1.40 parts of ion exchange water were added slowly under stirring while internal temperature is maintained at 40° C. or lower.

The inside of the reactor was thoroughly purged with nitrogen, and heated to raise its internal temperature to 68° C. Once the internal temperature was confirmed to have stabilized at 68° C. 0.02 parts of 4,4'-azobiscyanovaleric acid (product name "ACVA" by Otsuka Chemical Co., Ltd.) were added as the polymerization initiator, and since white turbidity was observed in the reaction solution at this point, this was taken as the polymerization initiation point. The polymerization reaction was continued with the external temperature (water bath temperature) being adjusted so as to gently reflux the solvent, and solvent reflux was maintained while 0.02 parts of ACVA were added 3 hours after the polymerization initiation point and an additional 0.035 parts of ACVA were added 6 hours after the polymerization initiation point, and the reflux of the solvent was continued. Cooling of the reaction solution was initiated 9 hours after the polymerization initiation point, the internal temperature was lowered to 30° C. and 19.6 parts of LiOH.$H_2O$ powder were then added slowly so that the internal temperature did not exceed 50° C. After the addition of the LiOH.$H_2O$ powder, stirring was continued for 3 hours to obtain a slurry-like polymer reaction solution comprising particles of the crosslinked polymer salt R-10 (neutralization degree 85 mol %) dispersed in the medium.

The resulting polymer reaction solution was centrifuged to precipitate the polymer particles, and the supernatant was removed. The precipitate was then re-dispersed in acetonitrile having the same mass as the polymer reaction solution, and the operations of precipitating the polymer particles by centrifugation and removing the supernatant were repeated twice. The precipitate was collected and dried for 3 hours at 80° C. under reduced pressure to remove the volatile components and obtain a powder of the crosslinked polymer salt R-10. Because the crosslinked polymer salt R-10 is hygroscopic, it was sealed and stored in a container with water vapor barrier properties. When the powder of the crosslinked polymer salt R-10 was measured by IR and the neutralization degree was determined from the intensity ratio of the peak derived from the C═O group of the carboxylic acid Li and the peak derived from the C═O of the lithium carboxylate, it was equal to the calculated value from charging, which was 85 mol %.

As in Manufacturing Example 9, the average particle diameter of the resulting polymer salt was measured in the 1 mass % NaCl aqueous solution. The results are shown in Table 1.

Manufacturing Example 11

Manufacture of Crosslinked Polymer R-11

A reactor equipped with a stirring blade, a thermometer, a reflux condenser and a nitrogen inlet pipe was used for polymerization.

880 parts of acetonitrile, 30 parts of AA, 70 parts of isobornyl acrylate, 1.00 parts of Neoallyl T-20, as well as triethylamine corresponding to 1.0 mol % of the AA were charged into the reactor. The inside of the reactor was thoroughly purged with nitrogen, and heated to raise its internal temperature to 55° C. Once the internal temperature was confirmed to have stabilized at 55° C. 0.0625 parts of V-65 were added as the polymerization initiator, and since white turbidity was observed in the reaction solution at this point, this was taken as the polymerization initiation point. The polymerization reaction was continued with the external temperature (water bath temperature) being adjusted to maintain the internal temperature of 55° C., then the temperature was increased to 65° C. at the time when 6 hours had elapsed since the polymerization initiation point. The internal temperature was maintained at 65° C., and cooling of the reaction solution was initiated when 12 hours had elapsed since the polymerization initiation point, and the internal temperature was cooled to 30° C. or lower to obtain a slurry-like polymerization reaction solution having particles of the crosslinked polymer salt R-11 (unneutralized) dispersed in the medium.

The resulting polymer reaction solution was centrifuged to precipitate the polymer particles, and the supernatant was removed. The precipitate was then re-dispersed in acetonitrile having the same mass as the polymer reaction solution, and the operations of precipitating the polymer particles by centrifugation and removing the supernatant were repeated twice. The precipitate was collected and dried for 3 hours at 80° C. under reduced pressure to remove the volatile components and obtain a powder of the crosslinked polymer salt R-11. Because the crosslinked polymer salt R-11 is hygroscopic, it was sealed and stored in a container with water vapor barrier properties.

Further, the Li neutralization product was prepared for the obtained crosslinked polymer R-11 (unneutralized) as in Manufacturing Example 1, after which the average particle diameter of the resulting polymer salt was measured in the 1 mass % NaCl aqueous solution. The results are shown in Table 1.

Manufacturing Example 13

Manufacture of Crosslinked Polymer Salt R-13

The same operations were performed as in Manufacturing Example 9 except that the charged amounts of each starting material were as shown in Table 1, to obtain crosslinked polymer salt R-13 in powder form. The crosslinked polymer salt R-13 was sealed and stored in a container having water vapor barrier properties. The powder of the crosslinked polymer salt R-13 was measured by IR and the neutralization degree was determined from the intensity ratio of the peak derived from the C═O group of the carboxylic acid Li and the peak derived from the C═O of the lithium carboxylate, it was equal to the calculated value from charging, which was 85 mol %.

The average particle diameter of the obtained polymer salt was measured in the 1 mass % NaCl aqueous solution as in Manufacturing Example 9. The results are shown in Table 1.

Manufacturing Example 15

Manufacture of Crosslinked Polymer R-15

The same operations were performed as in Manufacturing Example 11 except that the charged amounts of each starting material were as shown in Table 1, however, uniform stirring became difficult during the polymerization due to significant generation of aggregates by which the polymerizing operation had to be stopped, so crosslinked polymer R15 was not obtained.

TABLE 1

| | | | Manufacturing Example No. | | | | | | | | |
|---|---|---|---|---|---|---|---|---|---|---|---|
| | | | Manufac. Ex. 1 | | Manufac. Ex. 2 | | Manufac. Ex. 3 | Manufac. Ex. 4 | Manufac. Ex. 5 | Manufac. Ex. 6 | Manufac. Ex. 7 |
| | | | Crosslinked Polymer | | | | | | | | |
| | | | R-1 | | R-2 | | R-3 | R-4 | R-5 | R-6 | R-7 |
| Charged Substances [parts] | Monomer | AA | 99.90 | | 99.70 | | 99.00 | 99.00 | 98.00 | 96.50 | 94.00 |
| | | IBXA | | | | | | | | | 5.00 |
| | | PEA | | | | | | | | | |
| | Crosslinkable Monomer | T-20 | 0.10 | | 0.30 | | 1.00 | 1.00 | 2.00 | 3.50 | 1.00 |
| | | EGDMA | | | | | | | | | |
| | | MBAA | | | | | | | | | |
| | Initial Neutralization | LiOH•$H_2O$ | | | | | | | | | |
| | Organic Amine [mol %] | TEA | | | | | | | | | |
| | Polymerization Solvent | Water | | | | | | | | | |
| | | AcN | 880 | | 880 | | 880 | 440 | 880 | 880 | 880 |
| | | EAc | | | | | | 440 | | | |
| | | MeOH | | | | | | | | | |
| | Polymerization Inhibitor | V-65 | 0.0625 | | 0.0625 | | 0.0625 | 0.0625 | 0.0625 | 0.0625 | 0.0625 |
| | | Initial ACVA | | | | | | | | | |
| | | Added ACVA | | | | | | | | | |
| | Process Neutralization | LiOH•$H_2O$ | | | | | | | | | |
| Neutralization Degree (Initial Neutralization + Process Neutralization) | | | 0.0% | | 0.0% | | 0.0% | 0.0% | 0.0% | 0.0% | 0.0% |
| Average Particle Diameter Measurement in 1 wt % NaCl Water Solution | | Neutralization Degree | 85.0% | 85.0% | 90.0% | 95.0% | 85.0% | 85.0% | 85.0% | 85.0% | 85.0% |
| | | Average Particle Diameter [μm] | 2.0 | 1.8 | 1.8 | 1.8 | 1.7 | 5.6 | 2.0 | 3.8 | 2.1 |

| | | | Manufacturing Example No. | | | | | | | |
|---|---|---|---|---|---|---|---|---|---|---|
| | | | Manufac. Ex. 8 | Manufac. Ex. 9 | Manufac. Ex. 10 | Manufac. Ex. 11 | Manufac. Ex. 12 | Manufac. Ex. 13 | Manufac. Ex. 14 | Manufac. Ex. 15 |
| | | | Crosslinked Polymer | | | | | | | |
| | | | R-8 | R-9 | R-10 | R-11 | R-12 | R-13 | R-14 | R-15 |
| Charged Substances [parts] | Monomer | AA | 70.00 | 99.00 | 99.00 | 30.00 | 99.00 | 99.00 | 99.00 | 15.00 |
| | | IBXA | | | | 70.00 | | | | 85.00 |
| | | PEA | 29.00 | | | | | | | |
| | Crosslinkable Monomer | T-20 | 1.00 | 1.00 | 1.00 | 1.00 | | | | 1.00 |
| | | EGDMA | | | | | 1.00 | 1.00 | | |
| | | MBAA | | | | | | | 1.00 | |
| | Initial Neutralization | LiOH•$H_2O$ | | | 29.5 | | | | | |
| | Organic Amine [mol %] | TEA | | | | 1.0 | | | | 1.0 |
| | Polymerization Solvent | Water | | 4.40 | 1.40 | | | | | |
| | | AcN | 880.0 | 875.6 | | 880.0 | 880.0 | 880.0 | 880 | 880 |
| | | EAc | | | | | | | | |
| | | MeOH | | | 300 | | | | | |

TABLE 1-continued

| | | | | | | | | | |
|---|---|---|---|---|---|---|---|---|---|
| Polymerization Inhibitor | V-65 | 0.0625 | 0.0625 | | 0.0625 | 0.0625 | 0.0625 | 0.0625 | 0.0625 |
| | Initial ACVA | | | 0.020 | | | | | |
| | Added ACVA | | | 0.055 | | | | | |
| Process Neutralization | LiOH•$H_2O$ | | 49.1 | 19.6 | | | 49.1 | | |
| Neutralization Degree (Initial Neutralization + Process Neutralization) | | 0.0% | 85.0% | 85.0% | 0.0% | 0.0% | 85.0% | 0.0% | 0.0% |
| Average Particle Diameter Measurement in 1 wt % NaCl Water Solution | Neutralization Degree | 85.0% | 85.0% | 85.0% | 85.0% | 85.0% | 85.0% | 85.0% | — |
| | Average Particle Diameter [μm] | 2.4 | 2.2 | 13.1 | 1.2 | 26.8 | 29.3 | 31.5 | — |

The details of the compounds used in Table 1 are given below.

AA: Acrylic acid

IBXA: Isobornyl acrylate

PEA: Phenoxy ethyl acrylate (Osaka Organic Chemical Industry Ltd., Viscoat #192)

T-20: Trimethylolpropane diallyl ether (Daiso Co., Ltd. Neoallyl™ T-20)

EGDMA: Ethylene glycol dimethcylate

MBAA: methylene bisacrylamide

TEA: Triethylamine

AcN: Acetonitrile

EAc: Ethyl acetate

MeOH: Methanol

V-65: 2,2'-azobis(2,4-dimethylvaleronitrile) (product of Wako Pure Chemical Industries, Ltd.)

ACVA: 4,4'-azobiscyanovaleric acid (product of Otsuka Chemical Co., Ltd.)

(Electrode Evaluation: Negative Electrode)

Example 1

The coating properties of a mixture layer composition using graphite as the negative electrode active material and the crosslinked polymer R-1 as the binder, and the peel strength between the formed mixture layer and the collector (that is, the binding ability of the binder) were measured.

100 parts of natural graphite (product name "CGB-10" by Nippon Graphite Industries) and 2.2 parts of the crosslinked polymer R-1 in powder form were weighed and thoroughly premixed, and a solution in which 1.09 parts of LiOH—$H_2O$ powder (corresponding to neutralization degree of 85 mol %) were dissolved in 160 parts of ion-exchange water was added and pre-dispersed with the disperser, after which the main dispersion was performed for 15 seconds at the peripheral speed of 20 m/second with the thin film swirling mixer (Primix Corporation, FM-56-30) to obtain a slurry-like negative electrode mixture layer composition.

This mixture layer composition was coated with an adjustable applicator on a 20 μm-thick copper foil (Nippon Foil Mfg. Co., Ltd.) so that the dried and pressed film thickness was 50 μm, and then immediately dried for 10 minutes at 100° C. in the ventilating dryer to form a mixture layer. The external appearance of the resulting mixture layer was observed with the naked eyes, and the coating properties were evaluated according to the below standard and judged as good ("A").

(Coating Property Evaluation Standard)

A: No streaks, spots or other appearance defects observed on surface

B: Slight streaks, spots or other appearance defects observed on surface

C: Obvious streaks, spots or other appearance defects observed on surface (90° Peel Strength (Binding Ability))

The mixture layer density was adjusted with a roll press to 1.70±0.05 g/$cm^3$ to prepare an electrode, which was then cut into a 25 mm-wide strip to prepare a sample for peel testing. The mixture layer side of this sample was affixed to a horizontally fixed double-sided tape, after which dehydration was performed thereon at 60° C. under reduced pressure (10 kPa or less) by a vacuum dryer, and stored in aluminum laminate bag having water vapor barrier properties at 23° C., and then peeled at 90° at a rate of 50 mm/minute, and the peel strength between the mixture layer and the copper foil was measured. The peel strength was high at 6.3 N/m, exhibiting a favorable strength.

In general, when an electrode is cut, worked and assembled into a battery cell, greater peel strength is necessary to prevent the problem of detachment of the mixture layer from the collector (copper foil). The high peel strength in this case means that the binder provides excellent binding ability between the active materials and between the active material and the electrode, and suggests that it is possible to obtain a battery with excellent durability and little loss of capacity during charge-discharge cycle testing.

(Flex Resistance)

This was evaluated using the electrode sample similar to that used in the 90° peel strength test. The electrode sample was wrapped around a SUS rod with 2.0 mm diameter, the condition of the bent mixture layer was observed, and flex resistance was evaluated based on the following standard, resulting in an evaluation of "A".

A: No appearance defects observed in mixture layer

B: Fine cracks observed in mixture layer

C: Obvious cracks observed in the mixture layer, or the mixture layer partially detached Examples 2 to 13 and Comparative Examples 1 and 2

Mixture layer compositions were prepared by the same operations as in Example 1 except that types and quantities of the crosslinked polymers used as the binder, the neutralizers, and the ion exchange water were as shown in Tables 2 and 3, and the coating properties, 90° peel strength and flex resistance were evaluated. In preparing the mixture layer composition, the blending quantity of the ion exchange water was suitably adjusted to achieve suitable viscosity for coating. The results are shown in Tables 2 and 3.

TABLE 2

| | | Example 1 | Example 2 | Example 3 | Example 4 | Example 5 | Example 6 | Example 7 | Example 8 |
|---|---|---|---|---|---|---|---|---|---|
| Graphite (CGB-10) | | 100 | 100 | 100 | 100 | 100 | 100 | 100 | 100 |
| Crosslinked | Type | R-1 | R-2 | R-2 | R-2 | R-3 | R-4 | R-5 | R-6 |
| Polymer | Parts | 2.20 | 2.20 | 2.20 | 2.20 | 2.20 | 2.20 | 2.20 | 2.20 |
| Neutralizer | Type | $LiOH•H_2O$ | $LiOH•H_2O$ | $LiOH•H_2O$ | $LiOH•H_2O$ | $LiOH•H_2O$ | $LiOH•H_2O$ | $LiOH•H_2O$ | $LiOH•H_2O$ |
| | Parts | 1.09 | 1.09 | 1.15 | 1.22 | 1.08 | 1.08 | 1.07 | 1.05 |
| Neutralization Degree | | 85% | 85% | 90% | 95% | 85% | 85% | 85% | 85% |
| Ion Exchange Water | | 160 | 160 | 150 | 150 | 140 | 140 | 130 | 124 |
| Mixture Layer Slurry Concentration | | 38.9% | 38.9% | 40.4% | 40.4% | 42.1% | 42.1% | 43.9% | 45.0% |
| Coating Properties | | A | A | A | A | A | A | A | A |
| Peel Strength N/m | | 6.3 | 9.4 | 8.8 | 8.9 | 10.3 | 5.4 | 7.0 | 6.1 |
| Flex Resistance | | A | A | A | A | A | A | A | A |

TABLE 3

| | | Example 9 | Example 10 | Example 11 | Example 12 | Example 13 | Comparative Example 1 | Comparative Example 2 |
|---|---|---|---|---|---|---|---|---|
| Graphite (CGB-10) | | 100 | 100 | 100 | 100 | 100 | 100 | 100 |
| Crosslinked | Type | R-7 | R-8 | R-9 | R-10 | R-11 | R-12 | R-14 |
| Polymer | Parts | 2.20 | 2.20 | 2.20 | 2.20 | 2.20 | 2.20 | 2.20 |
| Neutralizer | Type | $LiOH•H_2O$ | $LiOH•H_2O$ | $LiOH•H_2O$ | $LiOH•H_2O$ | $LiOH•H_2O$ | $LiOH•H_2O$ | $LiOH•H_2O$ |
| | Parts | 1.03 | 0.76 | — | — | 0.33 | 1.08 | 1.08 |
| Neutralization Degree | | 85% | 85% | 85% | 85% | 85% | 85% | 85% |
| Ion Exchange Water | | 150 | 170 | 125 | 125 | 125 | 140 | 140 |
| Mixture Layer Slurry Concentration | | 40.4% | 37.5% | 45.0% | 45.0% | 45.0% | 42.1% | 42.1% |
| Coating Properties | | A | A | A | A | B | A | B |
| Peel Strength N/m | | 10.7 | 11.2 | 9.8 | 4.5 | 7.5 | 1.3 | 0.9 |
| Flex Resistance | | A | A | A | A | A | C | C |

Example 14

The coating properties of a mixture layer composition using silicon particles and graphite as the negative electrode active material and the crosslinked polymer salt R-9 as the binder, and the peel strength between the formed mixture layer and the collector (that is, the binding ability of the binder) were measured.

30 parts of silicon particles (Sigma-Aldrich Corporation, Si Nanopowder, particle diameter <100 nm) and 70 parts of natural graphite (product name "CGB-10" by Nippon Graphite Industries) were stirred for 1 hour at 300 rpm with a planetary ball mill (Fritsch GmbH, P-5). 1.8 parts of the crosslinked polymer salt R-9 in the powder form were weighed into the resulting mixture and thoroughly pre-mixed, 120 parts of ion-exchange water were added, and the mixture was pre-dispersed with the disperser, after which the main dispersion was performed for 15 seconds at the peripheral speed of 20 m/second with the thin film swirling mixer (Primix Corporation, FM-56-30) to obtain a slurry-like negative electrode mixture layer composition.

The obtained negative electrode mixture layer composition was evaluated similar to Example 1. However, the mixture layer concentration of the electrode sample used in the evaluation of 90° peeling strength and flex resistance was prepared to 1.85±0.05 g/cm$^3$. The result is shown in Table 4.

Example 15 and Comparative Examples 3 and 4

Mixture layer compositions were prepared by the same operations as in Example 14 except that the active materials and the crosslinked polymers used as the binder were as shown in Table 4, and the coating properties, 90° peel strength and flex resistance were evaluated. The results are shown in Table 4.

TABLE 4

| | | Example 14 | Example 15 | Comparative Example 3 | Comparative Example 4 |
|---|---|---|---|---|---|
| Active | Graphite | 70 | 85 | 70 | 85 |
| Material | Silicon Particles | 30 | 15 | 30 | 15 |
| Crosslinked | Type | R-9 | R-9 | R-13 | R-13 |
| Polymer Salt | Parts | 1.80 | 1.80 | 1.80 | 1.80 |
| Ion Exchange Water | | 120 | 120 | 120 | 120 |
| Mixture Layer Slurry Concentration | | 45.9% | 45.9% | 45.9% | 45.9% |
| Coating Properties | | A | A | A | A |
| Peel Strength N/m | | 18.7 | 15.0 | 2.7 | 2.1 |
| Flex Resistance | | A | A | C | C |

(Electrode Evaluation: Positive Electrode)

Example 16

The coating properties of a mixture layer composition using lithium nickel cobalt manganese oxide (NCM) as the positive electrode active material, acetylene black (AB) as the conductive assistant and the crosslinked polymer R-1 as the binder were measured, and the peel strength between the formed mixture layer and the collector (that is, the binding ability of the binder) was evaluated.

95 parts of NCM111 (Toda Kogyo Corp., NM-3050), 5 parts of AB (Denki Kagaku HS-100) and 1.5 parts of the crosslinked polymer R-1 in powder form were weighed and thoroughly premixed, 110 parts of ion-exchange water were added, and the mixture was pre-dispersed with the disperser, after which the main dispersion was performed for 15 seconds at the peripheral speed of 20 m/second with the thin film swirling mixer (Primix Corporation, FM-56-30) to obtain a slurry-like positive electrode mixture layer composition. Because lithium ions are eluted (alkalized, exchanged for protons in water) from the NCM in the positive electrode mixture layer composition, some (or all) of the carboxyl groups of the crosslinked polymer R-1 are neutralized and converted to lithium salts. This positive electrode mixture layer composition had a pH of 8.7.

This mixture layer composition was coated with the adjustable applicator on the 15 thick aluminum foil (Nippon Foil Mfg. Co., Ltd.) so that the dried and pressed film thickness was 50 μm, and then immediately dried for 10 minutes at 100° C. in the ventilating dryer to form a mixture layer. The external appearance of the resulting mixture layer was observed with the naked eyes, and the coating properties were evaluated according to the following standard and judged as good ("A").

(Coating Property Evaluation Standard)

A: No streaks, spots or other appearance defects observed on surface

B: Slight streaks, spots or other appearance defects observed on surface

C: Obvious streaks, spots or other appearance defects observed on surface (90° Peel Strength (Binding Ability))

The mixture layer density was adjusted with the roll press to 2.7±0.1 g/cm$^3$ to prepare an electrode, which was then cut into a 25 mm-wide strip to prepare a sample for the peel testing. The mixture layer side of this sample was affixed to a horizontally fixed double-sided tapes, after which dehydration was performed thereon at 60° C. under reduced pressure (10 kPa or less) by a vacuum dryer, and stored in an aluminum laminate bag having water vapor barrier properties at 23° C., and then peeled at 90° at the rate of 50 mm/minute, and the peel strength between the mixture layer and the copper foil was measured. The peel strength was high at 7.9 N/m, exhibiting a favorable strength.

(Flex Resistance)

Flex resistance was evaluated using the electrode sample similar to that used in the 90° peel strength test. The electrode sample was wrapped around the SUS rod with 2.0 mm diameter, the condition of the bent mixture layer was observed, and flex resistance was evaluated based on the following standard, resulting in an evaluation of "A".

A: No appearance defects observed in mixture layer

B: Fine cracks observed in mixture layer

C: Obvious cracks observed in mixture layer, or mixture layer partially detached

Examples 17 to 21 and Comparative Examples 5 and 6

Mixture layer compositions were prepared by the same operations as in Example 16 except that the crosslinked polymers used as the binder were as shown in Table 5, and the coating properties, 90° peel strength and flex resistance were evaluated. The results are shown in Table 5.

TABLE 5

| | | Example 16 | Example 17 | Example 18 | Example 19 | Example 20 | Example 21 | Comparative Example 5 | Comparative Example 6 |
|---|---|---|---|---|---|---|---|---|---|
| NCM | | 95 | 95 | 95 | 95 | 95 | 95 | 95 | 95 |
| Acetylene Black | | 5 | 5 | 5 | 5 | 5 | 5 | 5 | 5 |
| Crosslinked | Type | R-1 | R-2 | R-3 | R-4 | R-5 | R-6 | R-12 | R-14 |
| Polymer | Parts | 1.5 | 1.5 | 1.5 | 1.5 | 1.5 | 1.5 | 1.5 | 1.5 |
| Ion Exchange Water | | 110 | 110 | 110 | 110 | 110 | 110 | 110 | 110 |
| Mixture Layer Slurry Concentration | | 48.0% | 48.0% | 48.0% | 48.0% | 48.0% | 48.0% | 48.0% | 48.0% |
| Coating Properties | | A | A | A | B | A | A | B | C |
| Peel Strength N/m | | 7.9 | 11.1 | 11.2 | 6.1 | 10.5 | 9.9 | 3.3 | 1.9 |
| Flex Resistance | | A | A | A | B | A | A | C | C |

Examples 1 to 21 produce the electrode mixture layer composition including the binder for nonaqueous electrolyte secondary battery electrode belonging to the teachings herein and the electrode using the same. The coating properties of the respective mixture layer compositions (slurry) was excellent, and the peel strength between the mixture layer and the collector of the obtained electrode exhibits high values, and excellent binding ability is exhibited. Further, the flex resistance of the electrodes was also confirmed as surpassing a satisfying level.

On the other hand, with the crosslinked polymers R-12 to R-14 were crosslinked monomers obtained by using crosslinkable monomers other than trimethylolpropane diallyl ether and trimethylolpropane triallyl ether, in which the peel strength of the mixture layer was low, and the flex resistance of the electrode was also inadequate.

INDUSTRIAL APPLICABILITY

Because the binder for a nonaqueous electrolyte secondary battery electrode of the present teachings exhibits excellent binding ability in the mixture layer, the nonaqueous electrolyte secondary battery provided with the electrode obtained using this binder is expected to have good durability (cycle characteristics) even after repeated high-rate charge and discharge, and should be applicable to vehicle-mounted secondary batteries.

Moreover, the binder of the present teachings can also impart good flex resistance to the electrode mixture layer. Consequently, it can help to reduce troubles and increase yield during electrode manufacture.

The invention claimed is:

1. A binder for a nonaqueous electrolyte secondary battery electrode, the binder comprising a crosslinked polymer comprising an ethylenically unsaturated carboxylic acid and a crosslinkable monomer in constituent monomers, or salt thereof, wherein the crosslinked polymer comprises the ethylenically unsaturated carboxylic acid in an amount of 20 to 99.95 mass % of the total constituent monomers, and the crosslinkable monomer comprises at least one compound selected from the group consisting of trimethylolpropane diallyl ether and trimethylolpropane triallyl ether.

2. The binder for a nonaqueous electrolyte secondary battery electrode according to claim 1, wherein the crosslinked polymer comprises the at least one compound selected from the group consisting of trimethylolpropane diallyl ether and trimethylolpropane triallyl ether in an amount of 0.05 to 5 mass % of the total constituent monomers.

3. The binder for a nonaqueous electrolyte secondary battery electrode according to claim 1, wherein a particle diameter of the crosslinked polymer is 0.1 to 7.0 μm in a volume-based median diameter when the crosslinked polymer is neutralized to a neutralization degree of 80 to 100 mol %, subjected to water swelling in water, and then dispersed in a 1 mass % NaCl aqueous solution.

4. A nonaqueous electrolyte secondary battery mixture layer composition comprising a binder according to claim 1, an active material, and water.

5. The nonaqueous electrolyte secondary battery mixture layer composition according to claim 4, further comprising a carbon material or a silicon material as a negative electrode active material.

6. The nonaqueous electrolyte secondary battery mixture layer composition according to claim 4, further comprising a lithium-containing metal oxide as a positive electrode active material.

7. A nonaqueous electrolyte secondary battery electrode comprising a mixture layer on a collector surface, the mixture layer being constituted of a nonaqueous electrolyte secondary battery mixture layer composition according to claim 1.

8. The binder for a nonaqueous electrolyte secondary battery electrode according to claim 2, wherein a particle diameter of the crosslinked polymer is 0.1 to 7.0 μm in a volume-based median diameter when the crosslinked polymer is neutralized to a neutralization degree of 80 to 100 mol %, subjected to water swelling in water, and then dispersed in a 1 mass % NaCl aqueous solution.

* * * * *